L. W. CHUBB.
CIRCUIT INTERRUPTING SYSTEM.
APPLICATION FILED OCT. 7, 1915. RENEWED APR. 8, 1919.

1,320,125.

Patented Oct. 28, 1919.

WITNESSES:
Fred A. Lind
J H Procter

INVENTOR
Lewis W. Chubb
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CIRCUIT-INTERRUPTING SYSTEM.

1,320,125.    Specification of Letters Patent.    Patented Oct. 28, 1919.

Application filed October 7, 1915, Serial No. 54,560. Renewed April 8, 1919. Serial No. 288,656.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Circuit-Interrupting Systems, of which the following is a specification.

My invention relates to circuit-interrupting systems and particularly to means for interrupting a direct-current circuit, of an alternating-current-direct-current vapor converter system, in response to direct-current-circuit conditions.

One object of my invention is to provide a device, of the above indicated character, comprising means for so changing the potential of the anode or ionizing shields of a vapor converter that the arc of the converter is extinguished under predetermined conditions.

Another object of my invention is to provide means, responsive to certain conditions in a direct-current circuit, that is supplied with energy, through a vapor converter, from an alternating-current circuit, for so changing the potential of the anode or ionizing shields of the converter as to interrupt the direct-current circuit.

Copending U. S. application Serial No. 44,429, filed August 9, 1915, by S. W. Farnsworth and assigned to the Westinghouse Electric and Manufacturing Company, discloses a vapor converter having anode or ionizing shields for minimizing short circuiting and reverse arcing of vapor converters. I have determined, that, if the anode or ionizing shields are disconnected from the anode or connected to the cathode of the converter, the arc will be extinguished. In the carrying out of my invention, I provide an electro-responsive means that is actuated, in response to the circuit conditions in the direct-current circuit, to disconnect the anode shields from the respective anodes to thereby interrupt the direct-current circuit.

Figure 1:
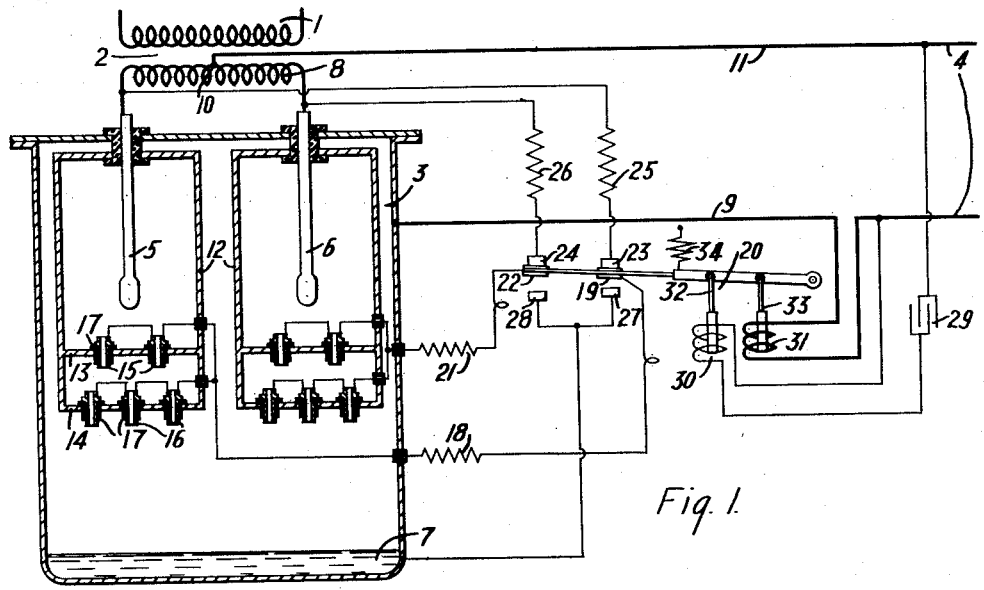
Figure 2:
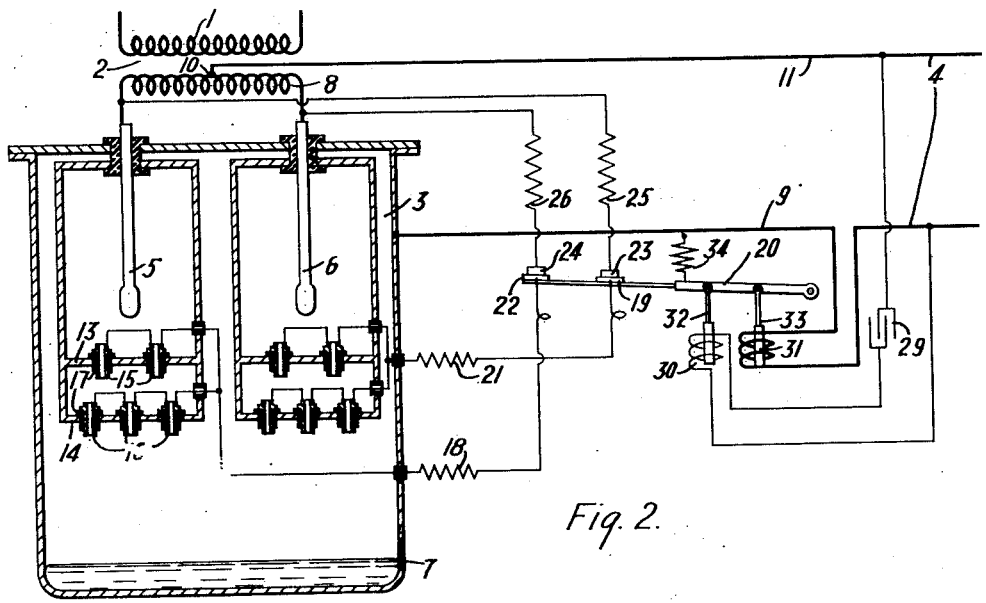

In the accompanying drawings, Figure 1 is a diagrammatic view, partially in section, of an electrical circuit embodying one form of my invention, and Fig. 2 is a diagrammatic view, partially in section, of an electrical circuit embodying a modified form of my invention.

An alternating-current circuit 1 supplies energy, through a transformer 2 and a vapor converter 3, to a direct-current circuit 4.

In Fig. 1 of the drawings, the vapor converter 3 is provided with solid anodes 5 and 6 and with a cathode 7 preferably composed of vaporizable reconstructing material, such, for example, as mercury or suitable amalgams. The two anodes 5 and 6 are connected, respectively, to the terminals of the secondary winding 8 of the transformer 2, and the cathode 7 is connected to one conductor 9 of the circuit 4. The mid-point 10 of the secondary winding 8 is connected to the other conductor 11 of the circuit 4. The anodes 5 and 6 are severally surrounded by a metallic casing 12 provided with transverse diaphragms 13 and 14 at the lower portion thereof. The diaphragms 13 and 14 are provided with a plurality of openings wherein are mounted short links of tubing 15 and 16 formed of conducting material. An insulating member 17 surrounds the tubular members 15 and 16 and insulates the same from the diaphragms 13 and 14, respectively. The tubular members 15 and 16 are preferably arranged in staggered relation.

The tubular members 15 and 16, that are associated with the anode 5, are connected through a resistor 18 to a movable contact member 19 which is mounted on the movable member of an electro-responsive device 20, and the tubular members 15 and 16, that are associated with the anode 6, are connected through a resistor 21 to the movable contact member 22 which is also mounted on the movable member of the electro-responsive device 20. The contact members 19 and 22 are adapted to normally engage stationary contact members 23 and 24, respectively, that are connected through resistors 25 and 26 to the respective anodes 5 and 6. The contact members 19 and 22 are adapted also to engage, under predetermined conditions, stationary contact members 27 and 28, respectively, that are operatively connected to the cathode 7 of the converter 3.

A condenser 29 is connected, in series relation, to an electromagnet winding 30, and the circuit, thus constituted, is connected in shunt to the circuit 4. A second electromagnet winding 31 is connected in circuit with the conductor 9 of the circuit 4. The windings 30 and 31 are provided with movable core members 32 and 33, respectively, that are operatively connected to the movable member of the electro-responsive device 20, the operation of which is adapted to disengage the contact members 19 and 23 and 22 and 24, respectively, and to engage the contact members 19 and 27 and 22 and 28, respectively, under predetermined conditions. A spring 34 is operatively connected to the movable member of the device 20 for the purpose of biasing it in such position that the contact members 19 and 23 and 22 and 24, respectively, are normally in engagement.

When an overload occurs in the circuit 4, sufficient current traverses the winding 31 to cause disengagement of the contact members 19 and 23 and 22 and 24, respectively, and engagement of the contact members 19 and 27 and 22 and 28, respectively, thereby changing the potential of the tubular members 15 and 16 from that of the anodes to that of the cathode, to thus extinguish the arcs between the anodes and cathode and interrupt the direct-current circuit 4. Any rapid fluctuation of the voltage of the circuit 4, due to a ground or a short circuit, causes the condenser 29 to discharge sufficient current through the winding 30 to effect disengagement of the contact members 19 and 23 and 22 and 24, respectively, and engagement of the contact members 19 and 27 and 22 and 28, respectively, thereby interrupting the direct-current circuit 4, substantially in a manner hereinbefore set forth.

In Fig. 2 of the drawings, the stationary contact members 27 and 28 have been omitted, but, in other respects, the system is substantially as shown in Fig. 1 of the drawings. The occurrence of an overload or a short circuit causes the contact members 19 and 23 and 22 and 24, respectively, to be disengaged, thereby disconnecting the tubular members 15 and 16 from their respective anodes to extinguish the arcs between the anodes and the cathode and thus interrupt the direct-current circuit 4.

I do not limit my invention to the particular type of anode shields or electro-responsive devices illustrated, as many modifications may be made therein without departing from the spirit and scope of my invention, as set forth in the appended claims.

I claim as my invention:

1. In a vapor converter, the combination with an electrode, a shielding member surrounding the electrode and a conducting arc-admitting member disposed within the shielding member and normally connected to the electrode, of means for disconnecting the conducting arc-admitting member from the electrode to extinguish the arc of the converter.

2. In a vapor converter, the combination with an electrode, a shielding member entirely surrounding the electrode and provided with a tubular arc-admitting member therein, and a conducting connection from the said tubular member to a source of potential of like polarity to said electrode, of means for interrupting said conducting connection to extinguish the arc of the converter.

3. In a vapor converter, the combination with an electrode, a shielding member entirely surrounding the electrode and provided with a tubular arc-admitting member therein, a conducting connection from the tubular member to the electrode, and a current-limiting device in said connection, of means for interrupting said conducting connection to extinguish the arc of the converter.

4. In a vapor converter, the combination with a cathode, an anode, a shielding member surrounding the anode and provided with a conducting arc-admitting member, and a conducting connection from the arc-admitting member to the anode, of means for interrupting the conducting connection to the anode and for establishing a conducting connection to the cathode to extinguish the arc of the converter.

5. In a distributing system, the combination with a direct-current circuit, an alternating-current circuit, and a vapor converter connected therebetween, of a shielding member surrounding the anode of the converter and provided with a conducting arc-admitting member, a conducting connection from the arc-admitting member to the anode, and means responsive to conditions in the direct-current circuit for interrupting the conducting connection.

6. In a distributing system, the combination with a direct-current circuit, an alternating-current circuit, and a vapor converter connected therebetween, of a shielding member surrounding the anode of the converter and provided with a conducting arc-admitting member, a conducting connection from the arc-admitting member to the anode, and means responsive to conditions in the direct-current circuit for interrupting the conducting connection and for effecting a conducting connection from the arc-admitting member to the cathode of the converter.

7. In a distributing system, the combination with a direct-current circuit, an alternating-current circuit, and a vapor converter connected therebetween, of a conducting potential-shielding member surrounding the anode of the converter, a conducting connection from the shielding member to the anode, electroresponsive means operatively connected to the direct-current circuit for interrupting the conducting connection from the shielding member to the anode to thereby interrupt the current traversing the direct-current circuit.

8. In a vapor converter, the combination with an anode, a conducting potential-shielding member entirely surrounding the anode within the converter, and a conducting connection from the shielding member to a source of potential of the polarity of said anode, of means for interrupting said conducting connection to extinguish the arc of the converter.

9. In a vapor converter, the combination with an anode, and a shielding member entirely surrounding the anode and having a conducting arc-admitting member therein that is insulated from the shielding member and normally connected to the electrode, of means for interrupting the connection between the tubular conducting member and the anode to extinguish the arc of the converter.

10. In a vapor converter, the combination with an anode, a potential-shielding member entirely surrounding the anode and having an arc-admitting member therein, and means for electrically connecting the anode to the arc-admitting member, of means for interrupting the connection to extinguish the arc of the converter.

11. In a vapor converter, the combination with an anode, a conducting potential-shielding member surrounding the anode, and a conducting connection from the shielding member to the anode, of automatic means for interrupting the conducting connection from the shielding member to the anode to thereby render the converter inoperative.

In testimony whereof, I have hereunto subscribed my name this 28th day of Sept. 1915.

LEWIS W. CHUBB.